United States Patent [19]

Foster

[11] Patent Number: 5,408,967
[45] Date of Patent: Apr. 25, 1995

[54] GASEOUS FUEL INJECTOR

[76] Inventor: Joseph S. Foster, P.O. Box 91016, West Vancouver, B.C., Canada, V7V 3N3

[21] Appl. No.: 139,669
[22] Filed: Oct. 22, 1993
[51] Int. Cl.⁶ ............................................. F02M 21/02
[52] U.S. Cl. .............................. 123/294; 123/27 GE; 123/526
[58] Field of Search .............. 123/27 GE, 526, 527, 123/472, 294

[56] References Cited

U.S. PATENT DOCUMENTS

| | | | |
|---|---|---|---|
| 4,306,532 | 12/1981 | Camacho | 123/527 |
| 4,325,343 | 4/1982 | Turner | 123/527 |
| 4,505,249 | 3/1985 | Young | 123/527 |
| 4,527,516 | 7/1985 | Foster | 123/27 GE |
| 4,679,538 | 7/1987 | Foster | 123/525 |
| 4,865,001 | 9/1989 | Jensen | 123/525 |
| 5,150,690 | 9/1992 | Carter et al. | 123/527 |

Primary Examiner—David A. Okonsky

[57] ABSTRACT

A fuel injection system for an engine having a cylinder, a piston in the cylinder, and an inlet port at the cylinder comprising a fuel inlet passage communicating with the inlet port and adapted to be connected to a fuel source and a fuel valve movable between an open position for allowing fuel to flow in the inlet passage and a closed position preventing fuel flow. The fuel valve is biased into one of the open or closed positions and a control system permits movement of the fuel valve to the open position at timed intervals to deliver metered volumes of fuel to the engine cylinder.

3 Claims, 1 Drawing Sheet

GASEOUS FUEL INJECTOR

FIELD OF THE INVENTION

This invention relates to a fuel injector for delivering gaseous fuel to an engine.

BACKGROUND OF THE INVENTION

Fuel injection systems are used to deliver fuel to internal combustion engines. The majority of fuel injection systems have been developed specifically to handle liquid fuels such as gasoline or diesel used in the engines of common passenger vehicles. Engines that run on alternative gaseous fuels such as natural gas or propane have also been developed. Applicant has developed a dual fuel engine that runs on diesel and a gas fuel such as propane or natural gas as disclosed in U.S. Pat. No. 4,527,516 issued Jul. 9, 1985.

Conversion kits have been developed for converting gasoline or diesel (liquid fuel) engines to natural gas or propane (gaseous fuel). Generally, these conversion kits comprise a fuel/air mixer system for delivering the gaseous fuel to the engine cylinders. To be commercially acceptable, a conversion system must satisfy the following conditions:
1. Be capable of producing adequate horsepower.
2. Be capable of producing adequate torque.
3. Be capable of producing good thermal efficiency.
4. Provide good engine balance i.e. uniform cylinder firing pressures.
5. Provide long service life.
6. Provide low exhaust emission levels.

The above conditions are best satisfied by a fuel delivery system that provides a precisely timed and metered injection of gaseous fuel to each cylinder of the engine.

SUMMARY OF THE INVENTION

The present invention provides a fuel injector that satisfies the above conditions. The injector of the present invention provides a low pressure, high frequency injector that is actuated by a preprogrammed electronic control module to provide a timed and metered volume of gaseous fuel to an internal combustion engine.

The present invention provides a fuel injection system for an engine having a cylinder, a piston in the cylinder, and an inlet port at the cylinder comprising:
  a fuel inlet passage communicating with the inlet port and adapted to be connected to a fuel source;
  fuel valve means movable between an open position for allowing fuel to flow in the inlet passage and a closed position preventing fuel flow;
  biasing means for biasing the fuel valve means into one of the open or closed positions; and
  means for controlling the biasing means to permit movement of the fuel valve means to the open position at timed intervals to deliver a metered volume of fuel to the engine cylinder.

The fuel injector of the present invention delivers pressurized gaseous fuel to an internal combustion engine that can be of two cycle and four cycle design. The fuel injector is particularly well suited to operation with a two cycle diesel engine and will allow such an engine to use natural gas or propane as a primary fuel to operate safely, efficiently and with adequate power and torque.

BRIEF DESCRIPTION OF THE DRAWINGS

Aspects of the present invention are illustrated, merely by way of example, in the accompanying drawings, in which.

DESCRIPTION OF THE PREFERRED EMBODIMENTS

Figure 1:
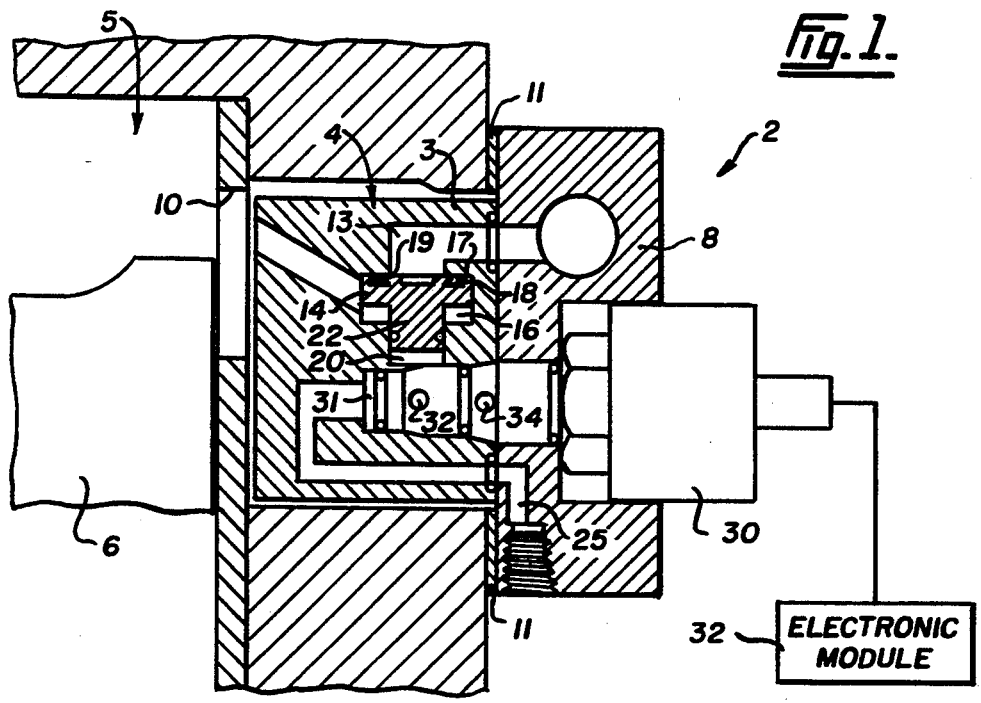
FIG. 1 is a detailed section view through a preferred embodiment of the fuel injector of the present invention.

Referring to FIG. 1, there is shown a preferred embodiment of the fuel injector 2 of the present invention attached to an engine block 4 that houses cylinder 5 and piston 6. Preferably, the fuel injector comprises a body 3 that is fastened to a header unit 8 and the combined assembly is fastened to the side of engine block 4 such that the injector body 3 extends into the block adjacent inlet port 10 of cylinder 6. Gasket 11 forms a gas tight seal with engine block 4. The fuel injector system of the present invention is intended for use with both two cycle and four cycle engines. While the operation of the injector is the same for all engines, the shape and angle of the fuel inlet passage and the mounting method of the injector body 3 will be customized to suit the make, model and fuelling requirements of the engine.

Fuel injector body 3 is formed with a fuel inlet passage 13 communicating inlet port 10 with a fuel source (not shown). The fuel source is preferably a pressurized container of gaseous fuel such as natural gas or propane. It has been determined that the injector of the present invention performs well when the fuel delivered to the injector is maintained at a relatively low pressure of 30 psi (207 kp) which is a practical pressure for a conventional fuel delivery system.

Within fuel inlet passage 13, there is a fuel valve means in the form of piston 14. Piston 14 is movable between an open position against lower seat 16 for allowing the pressurized gaseous fuel to flow in passage 13 and a closed position against upper seat 17 to block passage 13 and prevent fuel flow. O-ring 18 in the upper surface of piston 14 ensures a gas tight seal when the piston is in the closed position. O-ring 18 is preferably housed in an annular channel 19 of dovetailed cross-section formed in the upper surface of the piston. A polyimide resin manufactured by Dupont under the trademark "Vespel" is suitable for forming piston 14. This resin provides a light-weight, high strength piston that has very low inertia and can quickly move between the open and closed positions.

The position of piston 14 is manipulated by biasing means comprising a sealed chamber 20 in which a lower end 22 of piston 14 is slidably mounted. Chamber 20 communicates via passage 25 with a source of gas under pressure, preferably, compressed air. Therefore, chamber 20 is normally pressurized to exert a force on the piston 14 to bias the piston into the closed position to prevent gaseous fuel flow. Compressed air at 100 psi (690 kp) has been found to work well in testing of the fuel injector of the present invention.

The pressurization of chamber 20 is preferably controlled by a second valve in the form high speed solenoid valve 30. Solenoid valve 30 is in turn controlled via a control signal that originates in a pre-programmed electronic module 32. Solenoid valve 30 and its control module 32 are commercially available products.

Solenoid valve 30 is positioned within passage 25 and is formed with a central longitudinal passage having an inlet port 31, a second port 32 that communicates with chamber 20, and a third port 34 that exhausts to atmosphere. By default, inlet port 31 and second port 32 are open and third port 34 is closed such that solenoid valve 30 directs compressed air to chamber 20 to pressurize the chamber and bias piston 14 to the closed position.

On a signal from the electronic module, solenoid valve 30 is energized to close off inlet port 31 and open third port 34, thus connecting the second and third ports to release the air in chamber 20 and depressurize the chamber. This allows piston 14 to move into chamber 20 to open fuel inlet passage 13. In fact, the pressurized gas within fuel inlet passage 13 ensures that piston 14 moves very quickly to the open position. Passage 13 remains open a period to deliver an appropriate amount of gaseous fuel under pressure to the cylinder just before engine piston 6 closes off inlet port 10 of the cylinder. At the end of the injection period, solenoid valve 30 is de-energized by the electronic module to close third port 34 and open inlet port 31 allowing second port 32 to pressurize chamber 20, moving piston 14 to the closed position to shut off gaseous fuel flow.

This entire cycle of operation is repeated for each power stroke of the engine. At 2100 rpm, the fuel injection cycle repeats 35 times per second for a two cycle engine and 17 times per second for a four cycle engine. The fuel injector of the present invention uses a fuel valve (piston 14) that has very low inertia to accommodate the rapid movements between open and closed positions that happen each cycle. Also the fuel valve (piston 14) is well sealed to prevent gas leaks into the engine that would cause a loss of thermal efficiency and an increase in undesirable exhaust emissions.

Figure 2:
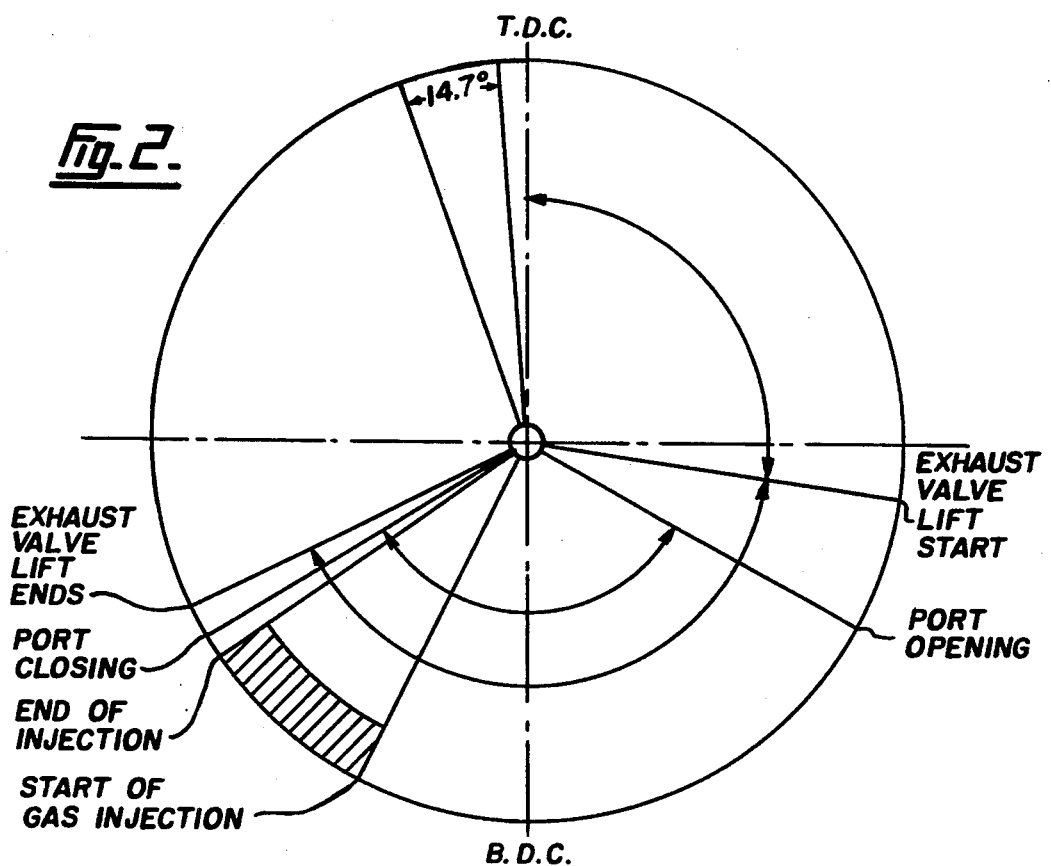
FIG. 2 illustrates the typical timing diagram for an engine fitted with the fuel injector of the present invention.

The electronic module is programmed to allow for the proper timing and duration of the fuel injection pulse. The engine timing diagram shown in FIG. 2 emphasizes that the valve timing of the engine is not in any way changed by the use of the fuel injection system of the present invention. The valve timing diagram is entirely conventional for a two cycle engine. For good thermal efficiency, the gaseous fuel must be injected after the scavenge cycle is virtually complete, so that raw fuel is not discharged with exhaust gases, but before the combustion air inlet cycle is complete. For a 2 stroke engine, the end of the inlet air cycle occurs when the rising piston closes of the inlet port, and for a 4 stroke engine when the inlet valve closes. It follows that the amount of time for gaseous fuel injection is extremely short, eg. about 1/400 of a second. Prototype testing also shows that for good thermal efficiency, injection timing should be retarded at low engine speeds and advanced for high engine speeds. This injection timing is easily preprogrammed into the controlling electronic module.

The fuel injector of the present invention has also been designed to minimize wear on impact surfaces and to be self compensating for any wear that might occur.

Although the present invention has been described in some detail by way of example for purposes of clarity and understanding, it will be apparent that certain changes and modifications may be practised within the scope of the appended claims.

I claim:

1. A gaseous fuel injection system for an engine having a cylinder, a piston in the cylinder, and an inlet port at the cylinder comprising:

a fuel inlet passage communicating with the inlet port for connection to a gaseous fuel source under pressure;

fuel valve means movable between an open position for allowing fuel to flow in the inlet passage and a closed position preventing fuel flow;

biasing means comprising a sealed chamber adjacent the fuel valve means that is pressurizable to exert a force on the fuel valve means to bias the fuel valve means into the closed position; and means for controlling the biasing means comprising second valve means to reduce pressure in the sealed chamber at timed intervals such that the pressurized gaseous fuel acts to move the fuel valve means to the open position to deliver fuel to the engine cylinder via the fuel inlet passage.

2. A fuel injection system as claimed in claim 1 in which the second valve means comprises a solenoid valve controlled a preprogrammed electronic module.

3. A fuel injection system as claimed in claim 1 in which the fuel valve means comprises a piston that is formed from a high strength, light weight plastic.

* * * * *